United States Patent
Matta (10) Patent No.: US 10,139,949 B2
(45) Date of Patent: Nov. 27, 2018

(54) INPUT DEVICE AND TOUCH PANEL DISPLAY

(71) Applicant: FUJITSU TEN LIMITED, Kobe-shi, Hyogo (JP)

(72) Inventor: Toshiharu Matta, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 102 days.

(21) Appl. No.: 15/293,979

(22) Filed: Oct. 14, 2016

(65) Prior Publication Data
US 2017/0131828 A1    May 11, 2017

(30) Foreign Application Priority Data
Nov. 10, 2015    (JP) .................. 2015-220628

(51) Int. Cl.
*G06F 3/041*    (2006.01)
*G06F 3/044*    (2006.01)

(52) U.S. Cl.
CPC ........... *G06F 3/0416* (2013.01); *G06F 3/044* (2013.01); *G06F 3/0412* (2013.01)

(58) Field of Classification Search
CPC .... G06F 3/0412; G06F 3/0416; G06F 3/0418; G06F 3/044
See application file for complete search history.

(56) References Cited

U.S. PATENT DOCUMENTS

2012/0188200 A1* 7/2012 Roziere .................. G06F 3/044
345/174

FOREIGN PATENT DOCUMENTS

WO    2011/142333 A1    11/2011

OTHER PUBLICATIONS

English Translation of WO2011142333.*

* cited by examiner

*Primary Examiner* — Nelson Rosario
(74) *Attorney, Agent, or Firm* — Oliff PLC (57) ABSTRACT

An input device according to an embodiment includes an electrostatic sensor, an operation surface, and a sensitivity adjusting layer. The electrostatic sensor includes a planar detection surface. The operation surface is non-parallel to the detection surface. The sensitivity adjusting layer is adjusted so that a region in which a distance between the operation surface and the detection surface is larger has a higher electric permittivity.

8 Claims, 6 Drawing Sheets

INPUT DEVICE AND TOUCH PANEL DISPLAY

CROSS-REFERENCE TO RELATED APPLICATION

This application is based upon and claims the benefit of priority of the prior Japanese Patent Application No. 2015-220628, filed on Nov. 10, 2015, the entire contents of which are incorporated herein by reference.

FIELD

The embodiment discussed herein is directed to an input device and a touch panel display.

BACKGROUND

An input device such as an electrostatic capacitive touch panel is variously used in a smartphone, an on-vehicle electronic device, etc. There is known this kind of input device whose operation surface has a convexly curved shape.

Moreover, there is further known an input device whose area of an electrode, which generates electrostatic capacity, is adjusted on the basis of the shape of an operation surface so that detection sensitivity is adjusted to be uniform regardless of the position at which a user touches the operation surface with his/her finger (for example, see W/O 2011/142333).

However, the aforementioned conventional technology has limitations in enlarging the electrode area, and thus has room for improvement in adjusting the detection sensitivity.

SUMMARY

An input device according to an embodiment includes an electrostatic sensor, an operation surface, and a sensitivity adjusting layer. The electrostatic sensor includes a planar detection surface. The operation surface is non-parallel to the detection surface. The sensitivity adjusting layer is adjusted so that a region in which a distance between the operation surface and the detection surface is larger has a higher electric permittivity.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, an exemplary embodiment of an input device and a touch panel display disclosed in the present application will be described in detail with reference to the accompanying drawings. In the present embodiment, an example in such a case that the input device is connected to an on-vehicle navigation device will be explained, however, the input device may be applied to an input device of an electronic device such as a smartphone or a tablet terminal. Moreover, it is not intended that this invention be limited to the embodiment described below.

Figure 1:
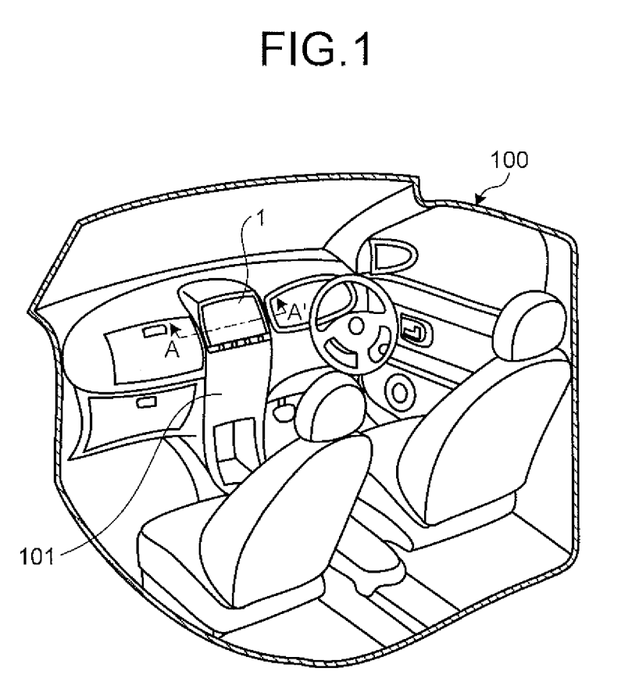
FIG. 1 is a diagram illustrating an application example of an input device according to an embodiment.

First, an application example of an input device according to the present embodiment will be explained with reference to FIG. 1. FIG. 1 is a diagram illustrating an application example of the input device according to the present embodiment. An input device 1 according to the present embodiment is constituted of, for example, an electrostatic-capacity type touch panel. When a finger of a user or the like touches an operation surface of the input device 1, the input device 1 detects an input operation of the user.

As illustrated in FIG. 1, the input device 1 is, for example, mounted on a vehicle 100, and is fixed to an instrument panel 101 of the vehicle 100. The input device 1 is connected to a navigation device (not illustrated) mounted on the vehicle 100 or the like, and functions as an input device of the navigation device.

An ordinary electrostatic capacitive input device will be here explained. The input device includes an operation surface and an electrostatic sensor. On a surface of the electrostatic sensor, for example, a plurality of transparent electrodes is arranged. When a finger of a user approaches the operation surface, electrostatic capacity is generated between the transparent electrodes of the electrostatic sensor and the finger of the user.

The electrostatic sensor detects a transparent electrode whose electrostatic capacity varies most within the plurality of the transparent electrodes, and thus a position (hereinafter, referred to as touch position) is detected in which the finger of the user touches the operation surface. In this case, the generated electrostatic capacity is known to vary in accordance with the distance between the finger of the user and the electrostatic sensor.

By the way, from the view point of design quality, when the shape of the instrument panel 101 of the vehicle 100 is, for example, a curved surface, it is desirable that the shape of a surface (i.e. operation surface) of the input device 1 is also a curved surface that is along the shape of the instrument panel 101.

In this case, when the operation surface is a curved surface while the electrostatic sensor is planar, the operation surface and the electrostatic sensor are non-parallel to each other, and thus the distance between the operation surface and the electrostatic sensor differs in accordance with the touch position.

As described above, because the electrostatic capacity varies in accordance with the distance between a finger of a user and the electrostatic sensor, the electrostatic capacity to be generated between the finger of the user and the electrostatic sensor differs in accordance with the touch position. Therefore, because the electrostatic capacity to be detected by the electrostatic sensor differs in accordance with the touch position, the detection sensitivity of the ordinary input device possibly varies in accordance with the touch position.

Specifically, in a region where the distance between the operation surface and the electrostatic sensor is large, even if the finger of the user touches the operation surface, for example, the electrostatic capacity is only generated a little. Therefore, the electrostatic sensor cannot detect the generated electrostatic capacity, and thus the touch position cannot be detected.

On the other hand, in a region where the distance between the operation surface and the electrostatic sensor is small, only if the finger of the user approaches the operation surface without touching the operation surface, for example, the electrostatic capacity is generated. Therefore, the electrostatic sensor detects the generated electrostatic capacity, thereby leading to an erroneous operation of the input device.

For this reason, in the input device 1 according to the present embodiment, a sensitivity adjusting layer is arranged between the operation surface and the electrostatic sensor in order to adjust the detection sensitivity, and thus the detection sensitivity is to be uniformized regardless of the touch position. Hereinafter, the outline of the input device 1 according to the present embodiment will be explained with reference to FIGS. 2A and 2B.

Figure 2A:
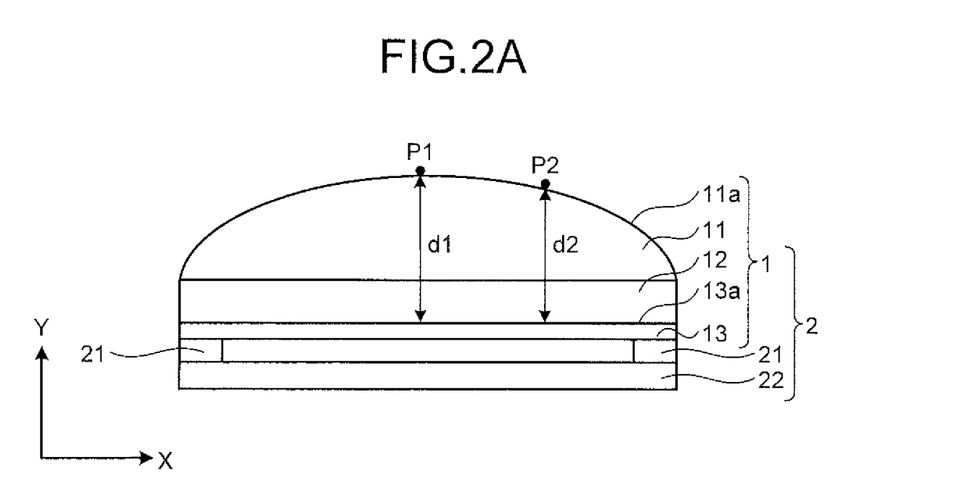
FIG. 2A is a schematic cross-sectional view illustrating the outline of the input device according to the embodiment.
Figure 2B:
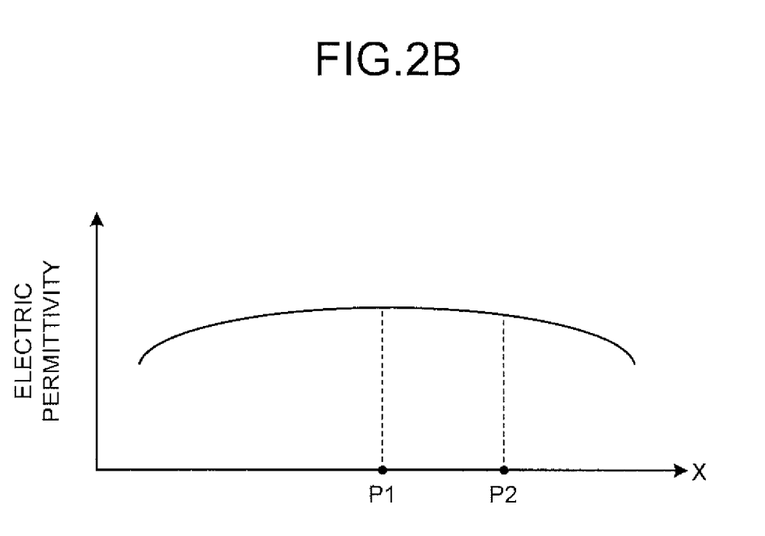
FIG. 2B is a diagram illustrating electric permittivity in a sensitivity adjusting layer.

FIG. 2A is a schematic cross-sectional view illustrating the outline of the input device 1 according to the embodiment. FIG. 2B is a diagram illustrating electric permittivity in a sensitivity adjusting layer 12. In the following explanation, the X and Y axes, which are orthogonal with each other, are defined in order to clarify the positional relationships. Moreover, a horizontal axis illustrated in FIG. 2B is corresponding to the X axis illustrated in FIG. 2A.

FIG. 2A corresponds to a cross-sectional view at A-A' line of the input device 1 illustrated in FIG. 1. Therefore, the X axis illustrated in FIG. 2A corresponds to, for example, the left and right direction of the instrument panel 101. As illustrated in FIG. 2A, the input device 1 includes a panel 11, the sensitivity adjusting layer 12, and an electrostatic sensor 13 in this order in the positive to negative direction of the Y axis. Therefore, the Y axis illustrated in FIG. 2A corresponds to a thickness direction of main constituent layers included in the input device 1. Moreover, a touch panel display 2 illustrated in FIG. 2A includes buffer members 21 and a display unit 22 in addition to the aforementioned constitution of the input device 1.

The panel 11 is constituted of, for example, reinforced glass whose surface is shaped in a convexly curved surface. A surface of the panel 11 in the positive Y axis direction is here an operation surface 11a.

The sensitivity adjusting layer 12 is arranged between the panel 11 and the electrostatic sensor 13, and, for example, is adjusted so that a region in which the distance between the operation surface 11a and a detection surface 13a is larger has higher electric permittivity. This is to make the electrostatic capacity to be generated between the finger of the user and the electrostatic sensor 13 uniform regardless of the touch position on the operation surface 11a.

As described above, the electrostatic capacity varies in accordance with the distance between the finger of the user and the detection surface 13a. Specifically, the electrostatic capacity is known to be smaller as the distance between the finger of the user and the detection surface 13a is larger. Moreover, the electrostatic capacity further varies in accordance with the electric permittivity between the finger of the user and the detection surface 13a. Specifically, the electrostatic capacity is known to be larger as the electric permittivity between the finger of the user and the detection surface 13a is higher.

Therefore, in the input device 1 according to the present embodiment, the electric permittivity of the sensitivity adjusting layer 12 is to be adjusted so that the electrostatic capacity is uniform regardless of the aforementioned distance. In other words, the electric permittivity of the sensitivity adjusting layer 12 is higher as the aforementioned distance is larger, so that the electrostatic capacity becomes uniform regardless of the aforementioned distance. Moreover, if the electrostatic capacity is inversely proportional to the aforementioned distance, it is sufficient that the electric permittivity of the sensitivity adjusting layer 12 is proportional to the distance.

For example, as illustrated in FIG. 2A, comparing a touch position P1 with a touch position P2, the distance d1 at the touch position P1 between the operation surface 11a and the detection surface 13a is larger than the distance d2 at the touch position P2. Therefore, as illustrated in FIG. 2B, the electric permittivity of the sensitivity adjusting layer 12 at the touch position P1 is adjusted to be higher than that at the touch position P2.

In this way, the sensitivity adjusting layer 12 is adjusted so that the electric permittivity is higher as the distance between the operation surface 11a and the detection surface 13a is larger. Therefore, the detection sensitivity on the operation surface 11a can be uniformized regardless of the touch position.

When the finger of the user approaches the operation surface 11a, the electrostatic sensor 13 generates the electrostatic capacity between the electrostatic sensor 13 and the finger of the user, and detects the touch position (P1, P2, etc. illustrated in FIG. 2A) from the position in which the electrostatic capacity varies.

For example, the electrostatic sensor 13 is formed by a planar-shaped substrate of polyethylene terephthalate, etc., and a film of a transparent electrode of indium tin oxide, etc. is formed on a surface of the substrate in the positive Y axis side by sputter deposition or the like. The transparent electrode becomes the detection surface 13a that detects variation of the electrostatic capacity.

In this way, the substrate of the electrostatic sensor 13 is shaped in planar, and thus the detection surface 13a, which detects the electrostatic capacity, also becomes planar. The electrostatic sensor 13 is constituted so that the detection sensitivity of the electrostatic capacity is uniform with respect to a direction along the X axis. This is to manufacture the electrostatic sensor 13 inexpensively while keeping the precision of the detection sensitivity.

When detecting the variation of the electrostatic capacity on the detection surface 13a, the electrostatic sensor 13 outputs the detection result to the navigation device using a cable (not illustrated), etc. The navigation device is to execute processing corresponding to the detection result.

The buffer members 21 are arranged at end parts of a space between the electrostatic sensor 13 and the display unit 22 to play a role of buffer material that buffers impact transmitted through the panel 11 in such a case that the user strongly operates the operation surface 11a. The buffer members 21 are made of gum, silicone, etc. Moreover, the buffer members 21 may be omitted.

The display unit 22 is, for example, a Thin Film Transistor liquid crystal (TFT liquid crystal), an organic Electro Luminescence display liquid crystal (organic EL display liquid crystal), etc., and displays a map image or the like that is an output result of the navigation device using, for example, a cable (not illustrated). The user is to visibly recognize the image displayed on the display unit 22 through the panel 11, the sensitivity adjusting layer 12, and the electrostatic sensor 13, which are aforementioned. Therefore, the aforementioned members of the panel 11, the sensitivity adjusting layer 12, and the electrostatic sensor 13 preferably include light-transmitting members.

In this way, in the input device 1 according to the present embodiment, the sensitivity adjusting layer 12 is arranged between the operation surface 11a and the detection surface 13a, and the sensitivity adjusting layer 12 is adjusted so that a region in which the distance between the operation surface 11a and the detection surface 13a is larger has higher electric permittivity. As a result, the detection sensitivity can be adjusted to be uniform in accordance with the shape of the operation surface 11a.

Because it is sufficient that the sensitivity adjusting layer 12 is added between the panel 11 and the electrostatic sensor 13 in addition to a constitution of an ordinary input device, the input device 1 according to the present embodiment can be easily manufactured.

In FIG. 2A, the touch panel display 2, which includes the input device 1, is illustrate as an example. However, the input device 1 may be used as a separate input device such as a touch-pad. In other words, the buffer members 21 and the display unit 22 illustrated in FIG. 2A may be omitted.

In FIG. 2A, the cross-section of the input device 1 is explained with respect to the direction along the X axis. However, the cross-section of the input device 1 in the perpendicular direction (depth direction in FIG. 2A (hereinafter, conveniently referred to as "Z axis direction") corresponding to up and down direction of the instrument panel 101 illustrated in FIG. 1) to the X and Y axes illustrated in FIG. 2A may be various shapes such as plano-convex and rectangular shapes. For example, in such a case that the shape of the cross-section of the input device 1 in the Z axis direction is plano-convex, the input device 1 is approximately hemispherical shape, and the operation surface 11a is a three-dimensional curved surface (curved surface curved in two or more directions that are mutually different). In such a case that the shape of the cross-section of the input device 1 in the Z axis direction is rectangular, the input device 1 is plano-convex shape, and the operation surface 11a is a two-dimensional curved surface (curved surface curved in only one direction). In such a case that the operation surface 11a is curved in the Z axis direction, it is desirable that the detection sensitivity of the operation surface 11a in the Z axis direction is also uniformized in the same method as that of the X axis direction.

Hereinafter, the sensitivity adjusting layer 12 illustrated in FIG. 2A will be explained more particularly. For example, the sensitivity adjusting layer 12 may be a member in which different electric-permittivity members are laminated, or may be a member in which the electric permittivity are varied along the X axis illustrated in FIG. 2A. Moreover, the sensitivity adjusting layer 12 may include both of the members.

Figure 3:
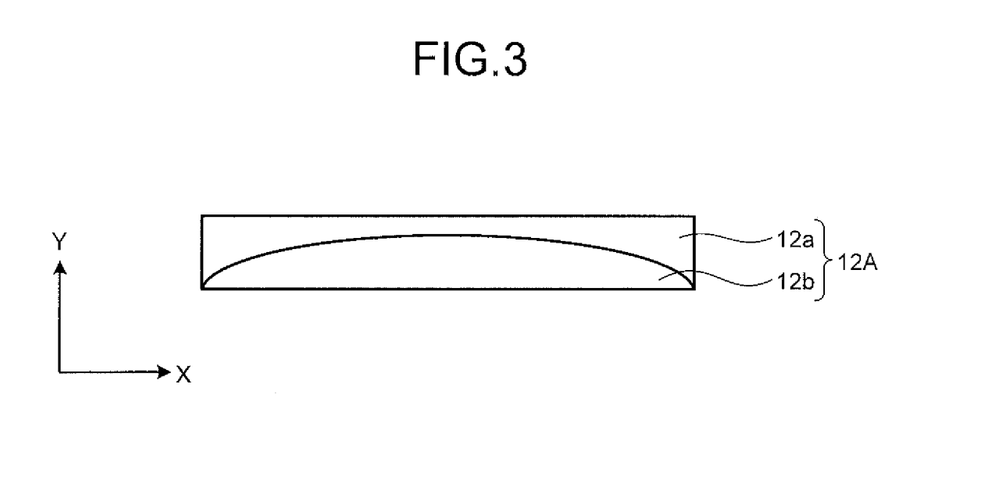
FIG. 3 is a schematic cross-sectional view illustrating a sensitivity adjusting layer in which different electric-permittivity layers are laminated.

First, the case in which the sensitivity adjusting layer 12 is a member in which the different electric-permittivity members are laminated will be explained with reference to FIG. 3. FIG. 3 is a schematic cross-sectional view illustrating a sensitivity adjusting layer 12A in which different electric-permittivity layers are laminated.

In FIG. 3, a case will be explained, in which the shape of the operation surface 11a of the input device 1 is a convexly curved surface that is the same as that in the case illustrated in FIG. 2A, and the electric permittivity of the sensitivity adjusting layer 12A is adjusted so that it becomes the electric permittivity illustrated in FIG. 2B. In the following description, parts same as those having already explained are denoted by identical reference symbols, and duplicate description will be omitted.

As illustrated in FIG. 3, the sensitivity adjusting layer 12A is constituted of two layers whose electric permittivity differs from each other. Specifically, the sensitivity adjusting layer 12A includes a first layer 12a whose electric permittivity is predetermined and a second layer 12b whose electric permittivity is larger than that of the first layer 12a.

The first layer 12a is formed so that, for example, a region thereof in which the distance between the operation surface 11a and the detection surface 13a is larger has smaller thickness, and a region thereof in which the distance between the operation surface 11a and the detection surface 13a is smaller has larger thickness.

The second layer 12b is formed so that a region thereof in which the distance between the operation surface 11a and the detection surface 13a is larger has larger thickness, and a region thereof in which the distance between the operation surface 11a and the detection surface 13a is smaller has smaller thickness.

In the example illustrated in FIG. 2A, because the shape of the operation surface 11a is convexly curved shape, the distance between the operation surface 11a and the detection surface 13a becomes larger toward the center thereof, and the distance between the operation surface 11a and the detection surface 13a becomes smaller toward the end parts thereof. Therefore, as illustrated in FIG. 3, the first layer 12a is plano-concave shape, and the second layer 12b is plano-convex shape.

In this way, in the sensitivity adjusting layer 12A, each thickness of the first layer 12a and the second layer 12b whose electric permittivity differs from each other is adjusted on the basis of the distance between the operation surface 11a and the detection surface 13a. Moreover, the electric permittivity is adjusted so that a region in which the distance between the operation surface 11a and the detection surface 13a is larger has a higher electric permittivity.

Therefore, the electric permittivity of the sensitivity adjusting layer 12A becomes the electric permittivity as illustrated in FIG. 2B. As a result, because the electrostatic capacity, which is generated when the finger of the user touches the operation surface 11a, becomes equal regardless of the touch position, the detection sensitivity of the input device 1 can be adjusted to be uniform.

Dielectric material such as epoxy resin, glass, polyethylene terephthalate resin, or acrylic resin can be used as the sensitivity adjusting layer 12A. The relative permittivity to air of the aforementioned dielectric material is "6" in epoxy resin, "5" in glass, "4" in polyethylene terephthalate resin, and "2" in acrylic resin.

Therefore, as a combination example of the sensitivity adjusting layer 12A, when polyethylene terephthalate resin whose relative permittivity is "4" is used in the first layer 12a, epoxy resin whose relative permittivity is "6" can be used in the second layer 12b.

In other words, if the electric permittivity of the first layer 12a is lower than that of the second layer 12b, an arbitrary combination other than the aforementioned combination may be employed to the sensitivity adjusting layer 12A. Moreover, liquid such as water or gas such as air may be used in the sensitivity adjusting layer 12A.

Also, the shape of each layer of the sensitivity adjusting layer 12A is not limited to the aforementioned example. For example, optimum shape can be decided by calculations, experiments, etc. on the basis of the electric permittivity of each dielectric member to be used in the first layer 12a and the second layer 12b.

In FIG. 3, the case is explained, in which the first layer 12a is formed in a more positive position in the Y axis direction than that of the second layer 12b, however, the second layer 12b may be formed in a more positive position in the Y axis direction than that of the first layer 12a. In other words, for example, a constitution may be employed, in which the constitution of the sensitivity adjusting layer 12A illustrated in FIG. 3 is inversed in line symmetry with respect to the X axis. Moreover, the case in which the sensitivity adjusting layer 12A is constituted of two layers is illustrated as an example, however, the sensitivity adjusting layer 12A may be constituted of three or more layers.

By the way, as described above, a member whose electric permittivity varies along the X axis illustrated in FIG. 2A may be employed as the sensitivity adjusting layer 12.

Figure 4:
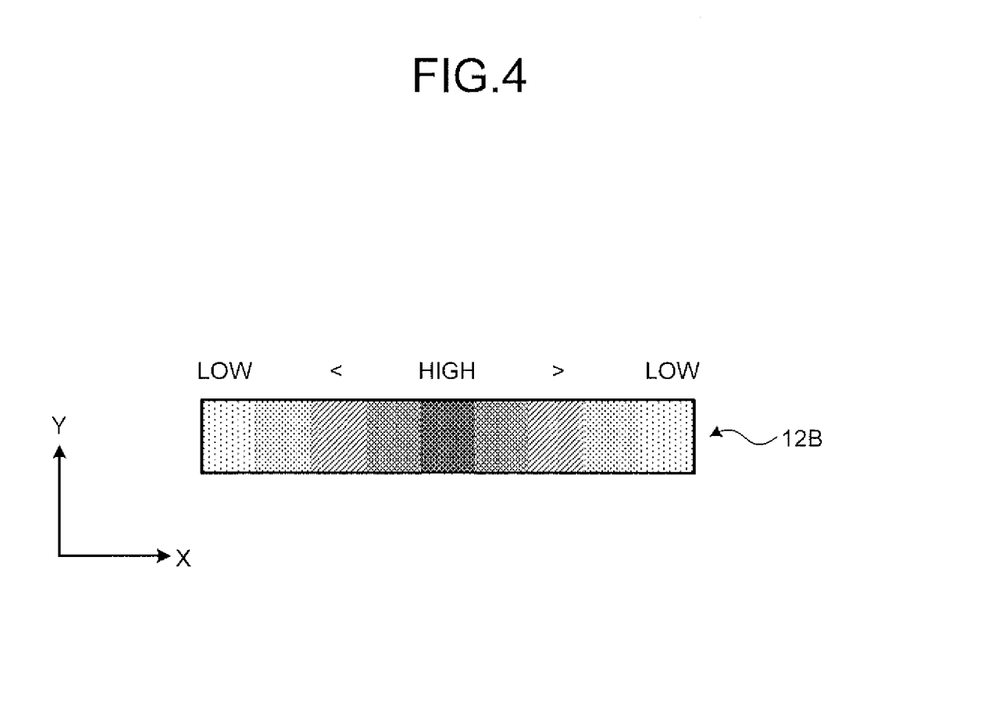
FIG. 4 is a schematic cross-sectional view illustrating a sensitivity adjusting layer that consists of materials having non-uniform electric-permittivity distribution.

Hereinafter, the case, in which the member in which the electric permittivity varies along the X axis illustrated in FIG. 2A is employed as the sensitivity adjusting layer 12, will be explained with reference to FIG. 4. FIG. 4 is a schematic cross-sectional view illustrating a sensitivity adjusting layer 12B that consists of materials having non-uniform electric-permittivity distribution.

As illustrated in FIG. 4, functional gradient material, in which the electric permittivity varies in the X axis direction illustrated in FIG. 4, can be used as the sensitivity adjusting layer 12B. The sensitivity adjusting layer 12B has the electric-permittivity distribution illustrated in FIG. 2B, in which the electric permittivity becomes higher toward the center thereof and becomes lower toward the end parts thereof.

An example of a manufacturing method of the functional gradient material will be described hereinafter. For example, using two kinds of particles whose electric permittivity differs from each other, and within the two kinds of particles, a mixture ratio of particles (hereinafter, referred to as high electric-permittivity particles) whose electric permittivity is higher and particles (hereinafter, referred to as low electric-permittivity particles) whose electric permittivity is lower is varied along the X axis illustrated in FIG. 4.

Specifically, both of the particles are arranged so that the mixture ratio of the high electric-permittivity particles is higher and the mixture ratio of the low electric-permittivity particles is lower toward the center of a mold in which the sensitivity adjusting layer 12B is formed. On the other hand, both of the particles are arranged so that the mixture ratio of the high electric-permittivity particles is lower and the mixture ratio of the low electric-permittivity particles is higher toward the end parts of the mold. Subsequently, the particles are melted by pressure treatment or heating treatment. As a result, the sensitivity adjusting layer 12B can be obtained, which includes mixed layers in which the electric permittivity varies in the X axis direction, in other words, in the direction along the detection surface 13a (see FIG. 2A).

In this way, the detection sensitivity of the input device 1 can be also adjusted to be uniform regardless of the touch position by the sensitivity adjusting layer 12B using the functional gradient material.

Moreover, the particles used for the material of the sensitivity adjusting layer 12B can be made of, for example, epoxy resin (relative permittivity is "6") for the high electric-permittivity particles and acrylic resin (relative permittivity is "2") for the low electric-permittivity particles.

If the high electric-permittivity particles are made of dielectric material whose electric permittivity is higher than that of the low electric-permittivity particles, an arbitrary combination of material can be employed other than the aforementioned combination. Moreover, an optimum mixture ratio of the particles to be used for the sensitivity adjusting layer 12B can be decided by calculations, experiments, etc.

The sensitivity adjusting layer 12B is here explained, as an example, to be constituted of two kinds of particles, however, the sensitivity adjusting layer 12B may be constituted of three or more kinds of particles. Moreover, not limited to the aforementioned example, various kinds of manufacturing methods may be employed as a manufacturing method of the sensitivity adjusting layer 12B.

As described above, the input device 1 according to the present embodiment includes the electrostatic sensor 13, the operation surface 11a, and the sensitivity adjusting layer 12. The electrostatic sensor 13 includes the detection surface 13a that is shaped planar. The operation surface 11a is configured so that it is non-parallel to the detection surface 13a. The sensitivity adjusting layer 12 is arranged between the operation surface and the detection surface, and is adjusted so that a region in which the distance between the operation surface 11a and the detection surface 13a is larger has higher electric permittivity.

Therefore, by employing the input device 1 according to the present embodiment, the detection sensitivity can be adjusted to be uniform in accordance with the shape of the operation surface 11a.

By the way, the case in which the input device 1 includes the operation surface 11a having convexly curved shape is explained in the aforementioned embodiment, however, the shape of the operation surface 11a is not limited thereto. Therefore, modified examples of the input device 1 according to variations of the shape of the operation surface 11a will be explained, hereinafter.

First Modified Example

Figure 5A:
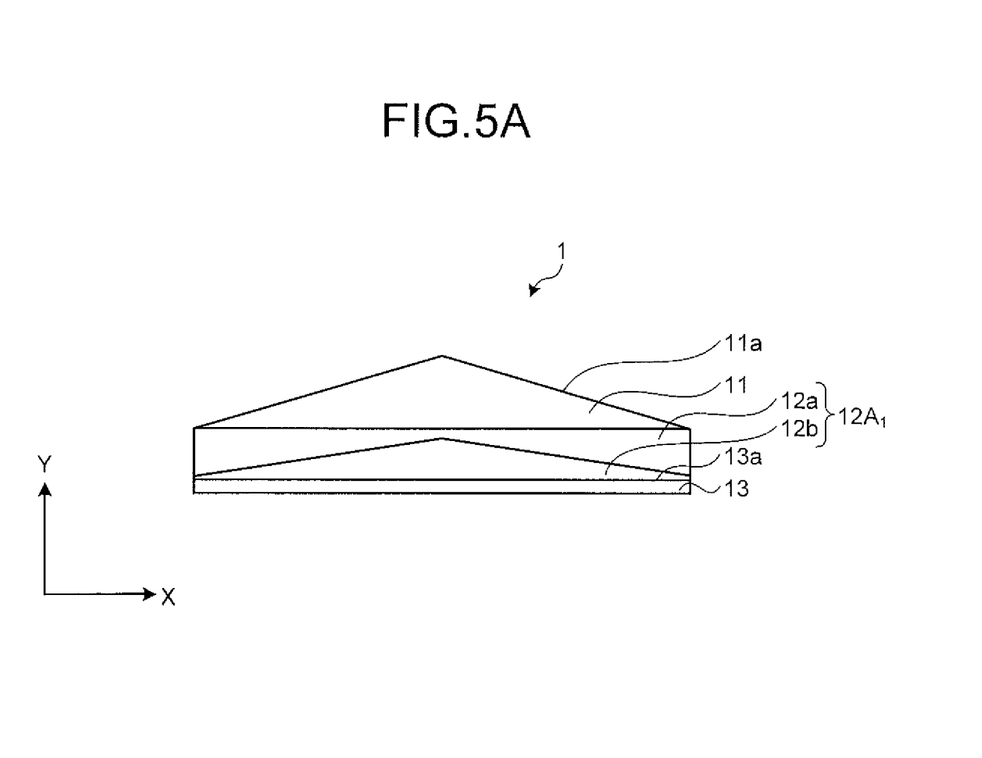
FIG. 5A is a schematic cross-sectional view illustrating an input device according to a first modified example.
Figure 5B:
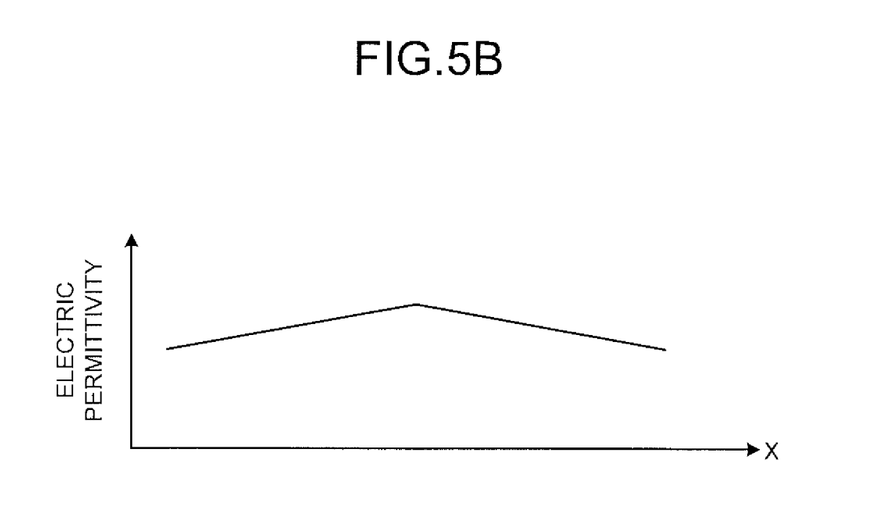
FIG. 5B is a diagram illustrating electric permittivity in a sensitivity adjusting layer according to the first modified example.

First, the input device 1 according to the first modified example will be explained with reference to FIGS. 5A and 5B. FIG. 5A is a schematic cross-sectional view illustrating the input device 1 according to the first modified example. FIG. 5B is a diagram illustrating electric permittivity in a sensitivity adjusting layer $12A_1$ according to the first modified example.

As illustrated in FIG. 5A, the input device 1 according to the first modified example includes the panel 11 whose surface, i.e. the operation surface 11a, has a convex shape having ascending slopes form the end parts to the center thereof. In this case, the distance between the operation surface 11a and the detection surface 13a varies along the ascending slope.

Specifically, the distance between the operation surface 11a and the detection surface 13a becomes larger toward the center of the operation surface 11a, and the distance between the operation surface 11a and the detection surface 13a becomes smaller toward both ends of the operation surface 11a.

Therefore, the first layer 12a of the sensitivity adjusting layer 12A$_1$ is shaped in a concave surface having, for example, descending slope from the center to the end parts thereof, on the other hand, the second layer 12b is shaped in a convex surface having ascending slopes from the end parts to the center thereof. As a result, the electric permittivity of the sensitivity adjusting layer 12A$_1$ can be adjusted as illustrated in FIG. 5B, and thus the detection sensitivity of the input device 1 can be adjusted to be uniform regardless of the touch position.

Second Modified Example

Figure 6A:
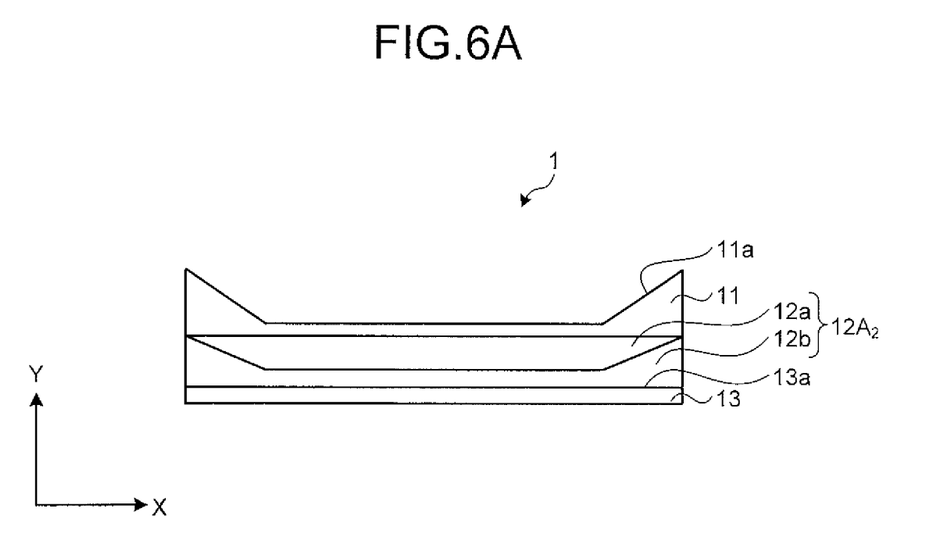
FIG. 6A is a schematic cross-sectional view illustrating an input device according to a second modified example.
Figure 6B:
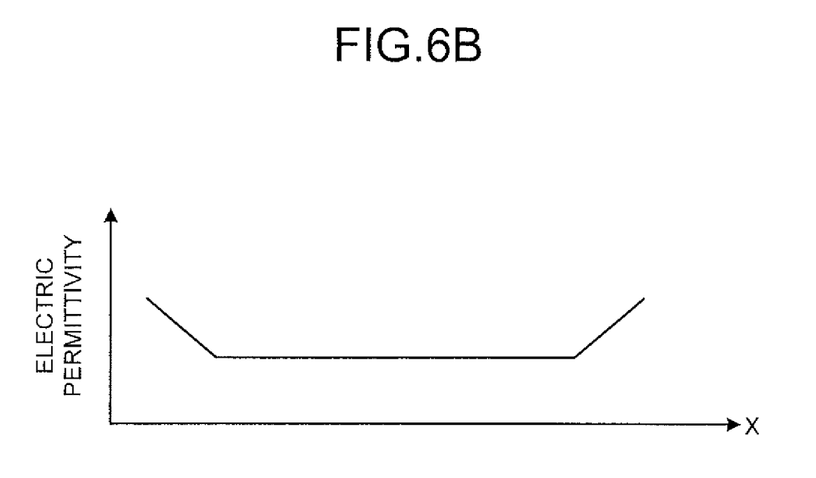
FIG. 6B is a diagram illustrating electric permittivity in a sensitivity adjusting layer according to the second modified example.

Next, the input device 1 according to the second modified example will be explained with reference to FIGS. 6A and 6B. FIG. 6A is a schematic cross-sectional view illustrating the input device 1 according to the second modified example. FIG. 6B is a diagram illustrating the electric permittivity in a sensitivity adjusting layer 12A$_2$ according to the second modified example.

As illustrated in FIG. 6A, the operation surface 11a of the input device 1 according to the second modified example is constituted of descending slopes from the end parts to the center thereof and a plane along the X axis between the slopes. In this case, the distance between the operation surface 11a and the detection surface 13a of the electrostatic sensor 13 becomes smaller along the descending slopes in the descending inclined parts, and is constant in the planar part.

Therefore, the first layer 12a of the sensitivity adjusting layer 12A$_2$ is shaped, for example, in a trapezoidal shape. On the other hand, the second layer 12b is shaped in a concave surface having descending slopes from both ends to the center thereof and a plane along the X axis between the descending slopes. As a result, the electric permittivity of the sensitivity adjusting layer 12A$_2$ can be adjusted as illustrated in FIG. 6B, and thus the detection sensitivity of the input device 1 can be adjusted to be uniform regardless of the touch position.

Third Modified Example

Figure 7A:
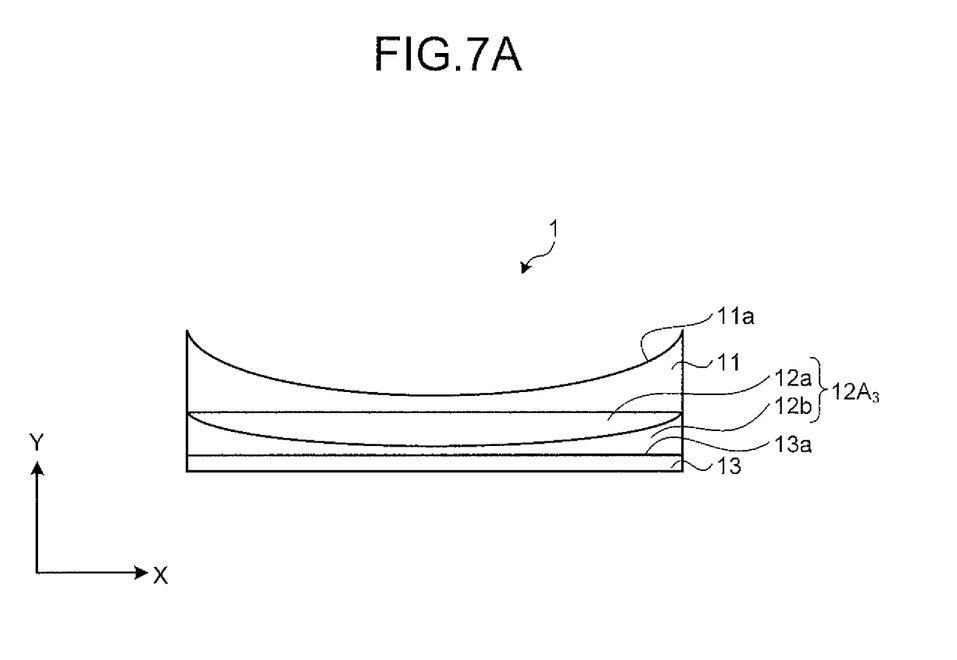
FIG. 7A is a schematic cross-sectional view illustrating an input device according to a third modified example.
Figure 7B:
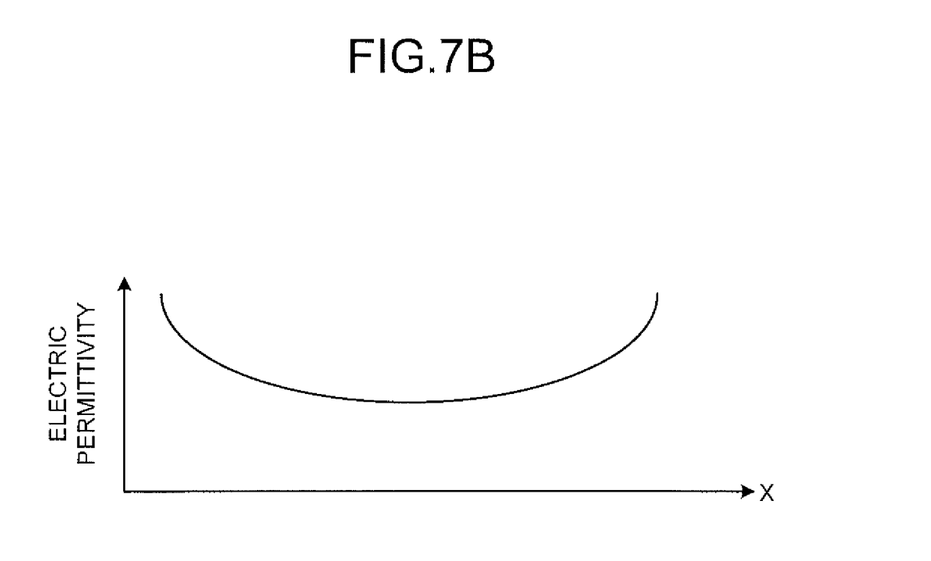
FIG. 7B is a diagram illustrating electric permittivity in a sensitivity adjusting layer according to the third modified example.

Next, an input device 1 according to the third modified example will be explained with reference to FIGS. 7A and 7B. FIG. 7A is a schematic cross-sectional view illustrating the input device 1 according to the third modified example. FIG. 7B is a diagram illustrating electric permittivity in a sensitivity adjusting layer 12A$_3$ according to the third modified example.

As illustrated in FIG. 7A, the operation surface 11a of the input device 1 according to the third modified example is shaped in a concavely curved surface. In this case, the distance between the operation surface 11a and the detection surface 13a becomes smaller toward the center thereof, and becomes larger toward the end parts thereof.

Therefore, the first layer 12a of the sensitivity adjusting layer 12A$_3$ is shaped in, for example, plano-convex. On the other hand, the second layer 12b is shaped in plano-concave. As a result, the electric permittivity of the sensitivity adjusting layer 12A$_3$ can be adjusted as illustrated in FIG. 73, and thus the detection sensitivity of the input device 1 can be adjusted to be uniform regardless of the touch position.

Each of the aforementioned shapes of the operation surface 11a of the input device 1 is an example of a representative shape, and the shape of the operation surface 11a may be a combination of whole or a part of the aforementioned shapes. In this case, the electric permittivity of the sensitivity adjusting layer 12 may be adjusted on the basis of the distance between the operation surface 11a and the detection surface 13a.

The aforementioned sensitivity adjusting layers 12 of the input device 1 according to the first to third modified examples may include the sensitivity adjusting layer 12B illustrated in FIG. 4 instead of the sensitivity adjusting layers 12A$_1$ to 12A$_3$.

Moreover, the sensitivity adjusting layer 12 may be constituted of a combination of the sensitivity adjusting layers 12A and 12B. Specifically, a constitution in which one of the first layer 12a and the second layer 12b of the sensitivity adjusting layer 12A is the sensitivity adjusting layer 12B, or a constitution in which the sensitivity adjusting layer 12 includes three or more layers including the first layer 12a, the second layer 12b, and the sensitivity adjusting layer 12B may be employed.

Moreover, a constitution in which the panel 11 serves for the functions of the sensitivity adjusting layer 12 may be employed. Specifically, for example, if the electric permittivity of the panel 11 is adjusted on the basis of the distance between the operation surface 11a and the detection surface 13a, the detection sensitivity of the input device 1 can be also adjusted by the panel 11.

As described above, according to an aspect of the embodiments, can be uniformized regardless of the touch position Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An input device comprising:
an electrostatic sensor whose detection surface is planar;
an operation surface that is non-parallel to the detection surface; and
a sensitivity adjusting layer that is arranged between the operation surface and the detection surface, electric permittivity of the sensitivity adjusting layer being changed in a direction along the detection surface so that a first region of the sensitivity adjusting layer has a higher electric permittivity than a second region of the sensitivity adjusting layer,
wherein a distance between the operation surface and the detection surface corresponding to the first region is larger than a distance between the operation surface and the detection surface corresponding to the second region.

2. The input device according to claim 1, wherein the sensitivity adjusting layer includes a first layer that has a predetermined electric permittivity and a second layer that has an electric permittivity higher than that of the first layer.

3. The input device according to claim 2, wherein the second layer is formed so that the region in which the distance between the operation surface and the detection surface is larger has larger thickness.

4. The input device according to claim 1, wherein the sensitivity adjusting layer includes a layer formed so that the electric permittivity is varied in the direction along the detection surface.

5. The input device according to claim 2, wherein the sensitivity adjusting layer includes a layer formed so that the electric permittivity is varied in a direction along the detection surface.

6. The input device according to claim 3, wherein the sensitivity adjusting layer includes a layer formed so that the electric permittivity is varied in a direction along the detection surface.

7. The input device according to claim 1, wherein the operation surface includes a convexly or concavely curved surface.

8. A touch panel display comprising:
an input device including:
an electrostatic sensor whose detection surface is planar;
an operation surface that is non-parallel to the detection surface; and
a sensitivity adjusting layer that is arranged between the operation surface and the detection surface, electric permittivity of the sensitivity adjusting layer being changed in a direction along the detection surface so that a first region of the sensitivity adjusting layer has a higher electric permittivity than a second region of the sensitivity adjusting layer; and
a panel-shaped display unit that is provided so that the electrostatic sensor is arranged between the operation surface and the display unit,
wherein a distance between the operation surface and the detection surface corresponding to the first region is larger than a distance between the operation surface and the detection surface corresponding to the second region.

* * * * *